(12) United States Patent
Shimizu et al.

(10) Patent No.: US 10,557,551 B2
(45) Date of Patent: Feb. 11, 2020

(54) COMBINED OIL CONTROL RING

(71) Applicant: KABUSHIKI KAISHA RIKEN, Tokyo (JP)

(72) Inventors: Hiroshi Shimizu, Kashiwazaki (JP); Hiroyuki Yabune, Kashiwazaki (JP)

(73) Assignee: KABUSHIKI KAISHA RIKEN, Tokyo (JP)

( * ) Notice: Subject to any disclaimer, the term of this patent is extended or adjusted under 35 U.S.C. 154(b) by 0 days.

(21) Appl. No.: 15/564,954

(22) PCT Filed: Apr. 8, 2016

(86) PCT No.: PCT/JP2016/061486
§ 371 (c)(1),
(2) Date: Oct. 6, 2017

(87) PCT Pub. No.: WO2016/163497
PCT Pub. Date: Oct. 13, 2016

(65) Prior Publication Data
US 2018/0094726 A1    Apr. 5, 2018

(30) Foreign Application Priority Data
Apr. 9, 2015 (JP) .................. 2015-079822

(51) Int. Cl.
*F16J 9/06* (2006.01)
*F16J 9/20* (2006.01)
*F16J 9/12* (2006.01)

(52) U.S. Cl.
CPC .............. *F16J 9/068* (2013.01); *F16J 9/20* (2013.01); *F16J 9/12* (2013.01)

(58) Field of Classification Search
CPC ...... F16J 9/06; F16J 9/066; F16J 9/067; F16J 9/068; F16J 9/12; F16J 9/20
See application file for complete search history.

(56) References Cited

U.S. PATENT DOCUMENTS 2,904,377 A * 9/1959 Endres ............... F16J 9/068
267/1.5
2,967,746 A * 1/1961 Braendel ........... F16J 9/068
277/480
(Continued)

FOREIGN PATENT DOCUMENTS

JP    57-38956 U    3/1982
JP    57-42134 U    3/1982
(Continued)

OTHER PUBLICATIONS

International Search Report for PCT/JP2016/061486 (PCT/ISA/210) dated Jun. 7, 2016.
(Continued)

*Primary Examiner* — Nicholas L Foster
(74) *Attorney, Agent, or Firm* — Birch, Stewart, Kolasch & Birch, LLP

(57) ABSTRACT

To provide a combined oil control ring comprising a pair of upper and lower side rails and an axially corrugated spacer expander having upper and lower portions for automobile engines, which is capable of keeping an excellent oil-controlling function without sticking between a spacer expander and side rails even in a long period of engine operation, the upper and lower portions of the spacer expander have tabs pushing inner peripheral surfaces of the side rails, projections supporting the side rails, and intermediate portions between the tabs and the projections; each intermediate portion opposing the side rail has at least one groove extending in a substantially circumferential direction is recessed when viewed along a radial direction.

5 Claims, 3 Drawing Sheets

(56) References Cited

U.S. PATENT DOCUMENTS

| | | | | | |
|---|---|---|---|---|---|
| 3,356,375 | A | * | 12/1967 | Harris | F16J 9/066 267/1.5 |
| 3,814,444 | A | * | 6/1974 | Johnson | F16J 9/068 277/480 |
| 4,429,885 | A | * | 2/1984 | Chiba | F16J 9/068 267/1.5 |
| 5,052,698 | A | * | 10/1991 | Kimura | F16J 9/065 277/477 |
| 5,195,758 | A | * | 3/1993 | Erway | F16J 9/066 267/1.5 |
| 7,036,823 | B2 | * | 5/2006 | Takiguchi | F16J 9/064 277/434 |
| 7,044,472 | B2 | * | 5/2006 | Takahashi | F16J 9/067 277/434 |
| 7,854,191 | B2 | * | 12/2010 | Kariya | F16J 9/068 92/160 |
| 9,303,765 | B2 | * | 4/2016 | Kunimoto | F16J 9/06 |
| 9,353,864 | B2 | | 5/2016 | Gao et al. | |
| 9,458,933 | B2 | * | 10/2016 | Ayuzawa | F16J 9/068 |
| 9,528,606 | B2 | * | 12/2016 | Hitosugi | F16J 9/068 |
| 9,657,838 | B2 | * | 5/2017 | Ooya | F16J 9/068 |
| 9,726,286 | B2 | * | 8/2017 | Ayuzawa | F16J 9/068 |
| 9,845,873 | B2 | * | 12/2017 | Ayuzawa | F16J 9/068 |
| 10,072,755 | B2 | * | 9/2018 | Ayuzawa | F16J 9/068 |
| 2003/0090066 | A1 | * | 5/2003 | Takahashi | F16J 9/067 277/434 |
| 2004/0061291 | A1 | * | 4/2004 | Takiguchi | F16J 9/064 277/446 |
| 2009/0013866 | A1 | * | 1/2009 | Kariya | F16J 9/067 92/172 |
| 2011/0221141 | A1 | * | 9/2011 | Ayuzawa | F16J 9/068 277/434 |
| 2012/0235359 | A1 | | 9/2012 | Gao et al. | |
| 2014/0062030 | A1 | * | 3/2014 | Hitosugi | F16J 9/068 277/489 |
| 2014/0246834 | A1 | * | 9/2014 | Ayuzawa | F16J 9/068 277/467 |
| 2014/0265149 | A1 | * | 9/2014 | Nakazawa | F16J 9/068 277/467 |
| 2015/0145218 | A1 | * | 5/2015 | Ooya | F16J 9/068 277/477 |
| 2015/0167844 | A1 | * | 6/2015 | Yabune | F16J 9/068 277/477 |
| 2015/0184747 | A1 | * | 7/2015 | Kunimoto | F16J 9/06 277/473 |
| 2017/0002925 | A1 | * | 1/2017 | Ayuzawa | F16J 9/068 |
| 2017/0002926 | A1 | * | 1/2017 | Ayuzawa | F16J 9/068 |
| 2018/0051806 | A1 | * | 2/2018 | Murata | F16J 9/068 |
| 2018/0112775 | A1 | * | 4/2018 | Shimizu | F02F 5/00 |

FOREIGN PATENT DOCUMENTS

| | | |
|---|---|---|
| JP | 59-127856 U1 | 8/1984 |
| JP | 2000-027995 A | 1/2000 |
| JP | 2002-310299 A | 10/2002 |
| JP | 2003-254155 A | 9/2003 |
| JP | 2006-258110 A | 9/2006 |
| JP | 2011-185383 A | 9/2011 |
| JP | 2012-233572 A | 11/2012 |
| JP | 2013-245780 A | 12/2013 |
| JP | 2014-040914 A | 3/2014 |
| WO | WO 2011/043364 A1 | 4/2011 |

OTHER PUBLICATIONS

Written Opinion of the International Searching Authority for PCT/JP2016/061486 (PCT/ISA/237) dated Jun. 7, 2016.

Extended European Search Report for European Application No. 16776663.3, dated Nov. 6, 2018.

* cited by examiner

COMBINED OIL CONTROL RING

FIELD OF THE INVENTION

The present invention relates to a combined oil control ring mounted to a piston for an internal combustion engine, particularly to a combined oil control ring comprising a pair of upper and lower side rails and an axially corrugated spacer expander having upper and lower portions.

BACKGROUND OF THE INVENTION

In automobile engines, lubricating oil is exposed to a blowby gas and heated for a long period of operation, so that the lubricating oil is contaminated with unburned hydrocarbons and degenerated oil additives (called "oil sludge" as a whole). The oil sludge includes oil sludge precursors having relatively low viscosity. The oil sludge attached to and accumulated on engine parts likely wears the parts and clogs lubricating oil paths, causing troubles in the functions of engine parts such as combined oil control rings (called "oil rings" unless otherwise mentioned). In the oil rings, spacer expanders and side rails are stuck to each other in the worst case, hindering the movement of separate side rails, and thus failing to exhibit a sufficient oil-controlling function.

As shown in FIG. 4(b), a conventional oil ring comprises a pair of annular side rails 120a, 120b each having a gap, and a spacer expander 101 supporting the side rails. As shown in FIG. 4(a), the spacer expander in an axially corrugated form has upper portions 102, lower portions 103, and leg portions 104 connecting the upper portions and the lower portions. The upper portions and the lower portions have tabs 105a, 105b on the inner side, and projections 106a, 106b supporting the side rails on the outer side, and dented intermediate portions 107a, 107b between the tabs and the projections. When the spacer expander is combined with the side rails, space 108a, 108b is defined by each tab, each projection, each intermediate portion and each side rail.

In the oil ring, the side rails 120a, 102b are pressed by radial and axial components of a force due to the inclination angle of the tabs 105a, 105b of the spacer expander 101, thereby sealing a cylinder wall surface and side surfaces of ring grooves of a piston. Particularly, a small-width oil ring having a small axial width h1 has good followability to a cylinder sidewall for a side-sealing function, resulting in reduced friction loss without increasing oil consumption even if it is a low-tension type. In the oil ring, however, oil sludge is easily accumulated in spaces 108a, 108b between the spacer expander and the side rails as described above. Particularly in the case of a small-width oil ring with extremely narrow space, the side rails 120a, 120b are highly likely stuck to the spacer expander 101 by the accumulated oil sludge. When sticking occurs, the followability of the side rails to the cylinder wall decreases extremely, resulting in drastically increased oil consumption.

To prevent the attachment and accumulation of oil sludge to an oil ring, the surface coatings of spacer expanders and side rails, and the structures of spacer expanders avoiding the accumulation of oil sludge were disclosed.

For example, Patent References 1 and 2 disclose a fluororesin coating and a fluororesin-containing resin coating, Patent Reference 3 discloses a coating containing fluoroalkyl-substituted alkoxide, Patent Reference 4 discloses a hydrophilic prepolymer coating containing inorganic polysilazane, Patent Reference 5 discloses a method for forming a metal coating having low surface free energy and hydrogen bonding force. They are water-repellant, oil-repellant coatings, or oppositely hydrophilic coatings, or those formed by methods of preventing the attachment of oil sludge.

As a structural measure, Patent Reference 6 discloses an oil ring comprising a spacer expander having upper and lower portions, and intermediate portions between the upper and lower portions, the intermediate portions having holes not reaching uprising portions of corrugation but sufficiently large to permit foreign materials such as lead compounds to pass. Patent References 7 and 8 disclose spacer expanders having structures comprising radial grooves in intermediate portions, and oil-exiting holes communicating with the grooves in tabs. Patent Reference 9 discloses a spacer expander having a structure preventing the accumulation of oil sludge in spaces between intermediate portions and side rails, the axial inclination angle θ of leg portions connecting upper and lower portions being 15° or more, and the upper and lower portions being circumferentially short.

However, the coating methods of Patent References 1-5 suffer excess steps leading to cost increase, and the hole-forming method of Patent Reference 6 needs difficult working, making the oil rings expensive. Also, oil resides in the grooves formed in intermediate portions in Patent References 7 and 8 while engines are stopped, likely suffering the accumulation of oil sludge. As a result, sufficient durability is not obtained in such an operation pattern as undergoing repeated start and stop of engines.

PRIOR ART REFERENCES

Patent Reference 1: JP 2002-310299 A
Patent Reference 2: JP 2003-254155 A
Patent Reference 3: JP 2000-027995 A
Patent Reference 4: JP 2006-258110 A
Patent Reference 5: WO 2011/043364 A1
Patent Reference 6: JUM 59-127856 A
Patent Reference 7: U.S. Pat. No. 5,195,758 B
Patent Reference 8: JP 2011-185383 A
Patent Reference 9: JP 2013-245780 A

OBJECT OF THE INVENTION

To solve the above problems, an object of the present invention is provide a combined oil control ring for automobile engines capable of keeping an excellent oil-controlling function, without suffering sticking between a spacer expander and side rails for a long period of engine operation.

SUMMARY OF THE INVENTION

As a result of computational fluid analysis of the flow of oil residing in an oil ring groove of a piston, to which an oil ring is attached, into oil return holes formed in the oil ring groove on the inner side, the inventors have found that the flow speed or rate of the oil is closely related to the volume of space between intermediate portions of a spacer expander and side rails. Taking into consideration that the number of oil return holes is much smaller than that of upper and lower portions of the spacer expander, and paying attention to the fact that to prevent the accumulation of oil sludge, oil flow in a circumferential direction of the spacer expander is more important than that in a radial direction, the inventors have conceived of the combined oil control ring of the present invention, which has a relatively large volume of space between the intermediate portions of the spacer expander and the side rails, such that oil flows more easily in a circumferential direction of the spacer expander than in a radial direction.

Thus, the combined oil control ring of the present invention comprises a pair of upper and lower side rails, and an axially corrugated spacer expander having upper and lower portions; the upper and lower portions of the spacer expander comprising tabs pushing inner peripheral surfaces of the side rails, projections supporting the side rails, and intermediate portions between the tabs and the projections; each intermediate portion opposing the side rail having at least one groove; and the groove extending in a substantially circumferential direction and being recessed when viewed along a radial direction. The depth d of each groove is preferably 0.5-20% of the combined width h1.

The groove preferably has a raised bottom when viewed along a substantially circumferential direction. In this case, the depth d' of the groove at a top of the raised bottom is preferably 0.5-20% of the combined width h1.

Though each groove may be constituted by curved surfaces, it is preferably constituted by pluralities of flat planes to ensure the gradient of the groove.

Effects of the Invention

The oil ring of the present invention comprises grooves extending in a substantially circumferential direction and recessed when viewed along a radial direction, in intermediate portions of a spacer expander, such that the grooves provide substantially expanded space between the intermediate portions and the side rails. With an oil flow generated in the intermediate portions in a circumferential direction, oil can be flown to lower portions of a spacer expander having much larger space than that of penetrating holes of tabs disclosed as oil-flowing holes in Patent References 7 and 8, thereby preventing the retention of oil. With each groove having a raised bottom when viewed along a substantially circumferential direction, oil easily flows from the intermediate portions to both circumferential sides. When combined with a resin coating or a metal coating such as Ni for preventing sticking, excellent effect of preventing the retention of oil can be further exhibited. As a result, the accumulation of oil sludge can be prevented even in a small-width, low-tension oil ring. With this structure, the oil ring can exhibit sufficient durability in an operation pattern repeating the start and stop of an engine, without residing oil in space between the spacer expander and the side rails even when the engine is stopped.

DESCRIPTION OF THE PREFERRED EMBODIMENTS

Figure 1A:
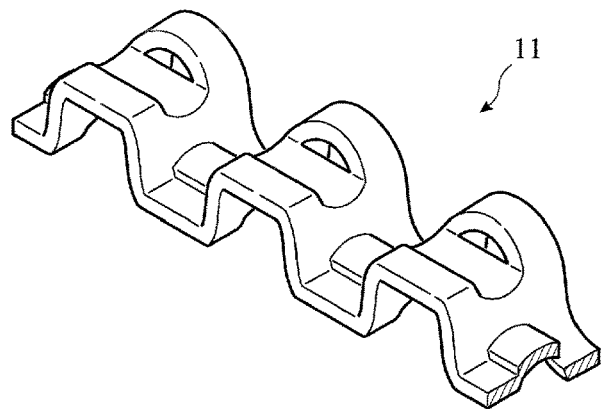
FIG. 1(a) is a perspective view partially showing an example of spacer expanders constituting the oil ring of the present invention.

The examples of the oil ring of the present invention will be explained below referring to the drawings.

Figure 1B:
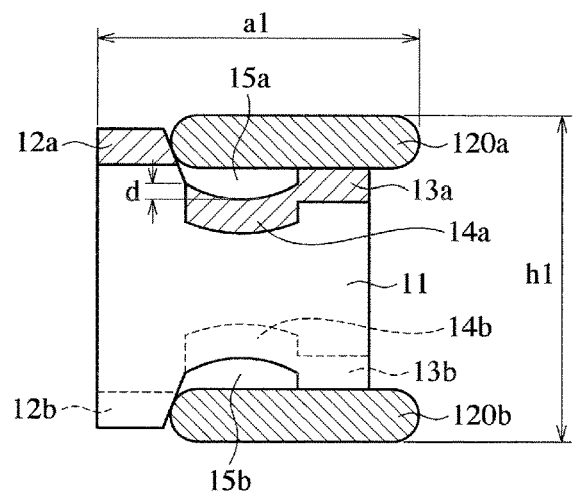
FIG. 1(b) is a cross-sectional view showing the oil ring of the present invention, in which the spacer expander of FIG. 1(a) is combined with side rails.

FIGS. 1(a) and 1(b) show an example of spacer expanders constituting the oil ring of the present invention. Like a conventional spacer expander, the spacer expander 11 comprises upper and lower portions each having a tab 12a, 12b, a projection 13a, 13b and an intermediate portions 14a, 14b. Each intermediate portion opposing a side rail has a substantially circumferentially extending groove, which is arcuately recessed when viewed in a radial direction. In this structure, the grooves have curved surfaces. This shape provides large spaces 15a, 15b between the intermediate portions of the spacer expander and the side rails. The depth d of each groove, an index indicating the size of the space, is preferably 0.5-20% of the combined nominal width h1. Specifically, the depth d is preferably 0.05 mm or more, and its upper limit is preferably not more than 0.5 mm.

Figure 2:
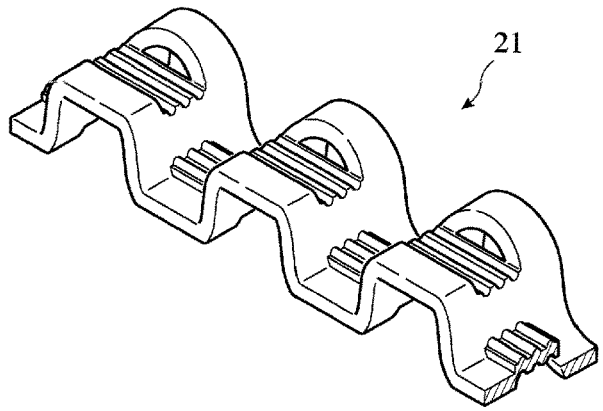
FIG. 2 is a perspective view partially showing another example of spacer expanders constituting the oil ring of the present invention.

FIG. 2 shows a spacer expander 21 having pluralities of grooves in its intermediate portion in another embodiment.

Figure 3A:
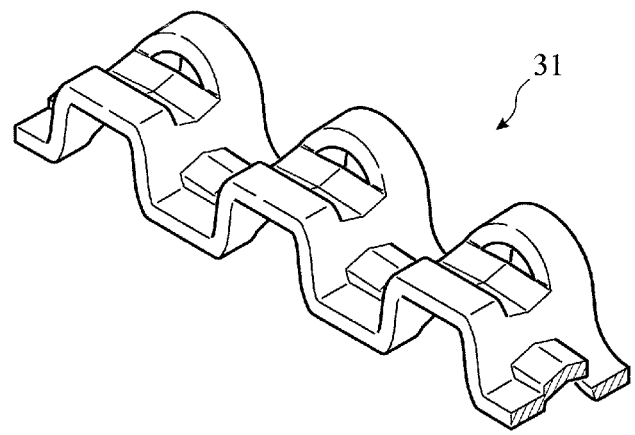
FIG. 3(a) is a perspective view partially showing a further example of spacer expanders constituting the oil ring of the present invention.
Figure 3B:
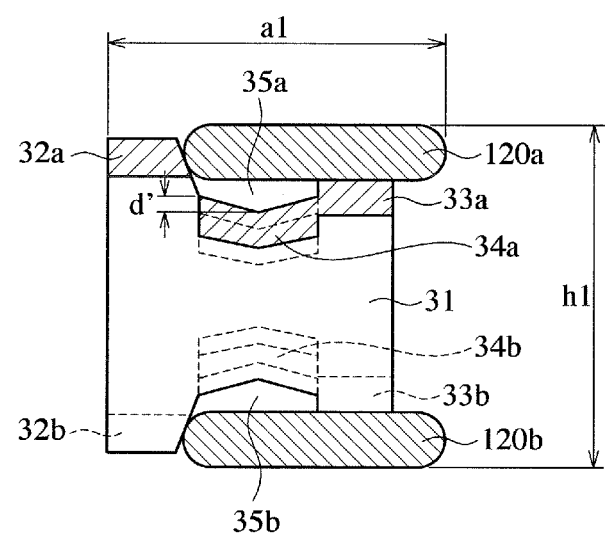
FIG. 3(b) is a cross-sectional view showing the oil ring of the present invention, in which the spacer expander of FIG. 3(a) is combined with side rails.

FIGS. 3(a) and 3(b) show a further example of spacer expanders 31, which comprises intermediate portions 34a, 34b having grooves defined by pluralities of planar portions. Each groove bottom is raised in a reverse V shape when viewed along a substantially radial direction, and recessed in a V shape when viewed along a circumferential direction. The basically V-shaped recess when viewed along a circumferential direction provides a large space 35a, 35b between each intermediate portion of the spacer expander and the side rail, and the raised bottom when viewed along a substantially radial direction makes it easy to flow oil from the intermediate portion to both circumferential sides. The depth d' of each groove at a top of the raised bottom is preferably 0.5-20% of the combined width h1. Specifically, the depth d' is preferably 0.05 mm or more, and its upper limit is preferably not more than 0.5 mm.

The above spacer expander can be formed by plastically working a wire.

Example 1

A SUS440 wire of 0.35 mm×1.72 mm was formed into side rails, and a SUS304 wire of 0.25 mm×1.9 mm was formed into a spacer expander, to produce a combined oil ring having a nominal diameter d1 of 71 mm, a nominal combined width h1 of 2.0 mm, and a combined thickness a1 of 2.3 mm. The spacer expander had a pitch of 2.7 mm from an upper portion (lower portion) to an upper portion (lower portion), and each groove in the intermediate portion had a curved surface shape with a depth d of 0.1 mm as shown in FIGS. 1(a) and 1(b). There were spaces 15a, 15b of 0.2 mm between the deepest points of grooves in the intermediate portions of the spacer expander and the side rails.

Example 2

As shown in FIGS. 3(a) and 3(b), a combined oil ring was produced in the same manner as in Example 1, except for changing each groove in the intermediate portion of the spacer expander to a groove constituted by four planar portions such that it was raised in a reverse V shape when viewed along a radial direction. The depth d' of each groove at a top of the raised bottom was 0.1 mm. Spaces 15a, 15b between the deepest points of the intermediate portions of the spacer expander and the side rails were as wide as 0.2 mm.

Comparative Example 1

Figure 4A:
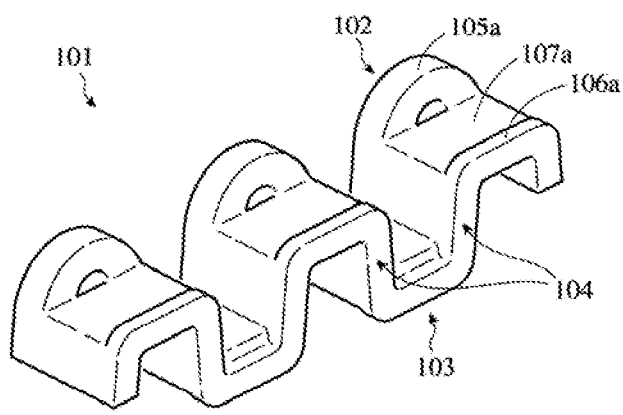
FIG. 4(a) is a perspective view partially showing a conventional spacer expander.
Figure 4B:
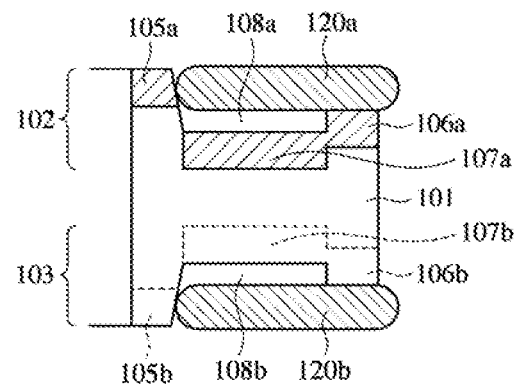
FIG. 4(b) is a cross-sectional view showing a conventional oil ring.

As shown in FIGS. 4(a) and 4(b), a combined oil ring was produced in the same manner as in Example 1, except for using a conventional spacer expander having flat intermediate portions with no grooves. The distance between a side-rail-supporting surface of each projection and each intermediate portion was 0.1 mm.

Example 3

A SUS304 wire for a spacer expander used in Example 1 was provided with a Ni plating comprising a half-luster Ni plating layer and a bright Ni plating layer using a sulfamate solution, and subjected to a softening heat treatment at 600° C. for 30 seconds. The resultant Ni plating had a thickness of 5 μm and hardness of 214 HV0.01. A combined oil ring was produced in the same manner as in Example 1 except for using this Ni-plated wire.

Example 4

A combined oil ring was produced in the same manner as in Example 2 except for using a Ni-plated wire in Example 3.

[1] Actual Engine Test

Each combined oil ring of Examples 1 and 2 and Comparative Example 1 was mounted to each of first to third cylinders in a one-liter, three-cylinder engine. This engine was repeatedly subjected to a predetermined operation pattern for an actual engine test. According to the following evaluation methods after 250 hours, the gaps of side rails and the amount of oil sludge deposited were measured. Each measurement was conducted three times in each Example and Comparative Example. Top and second rings used had the following specifications.

(1) Top Ring
Material: SWOSC-V,
Outer peripheral surface: ion-plated with chromium nitride, and
Size: d1=71 mm, h1=1.0 mm, and a1=2.3 mm.
(2) second Ring
Material: SWOSC-V,
Entire surface: treated with zinc phosphate, and
Size: d1=71 mm, h1=1.0 mm, and a1=2.3 mm.

Using the above one-liter, three-cylinder engine, the combined oil rings of Examples 3 and 4 and Comparative Example 1 were subjected to the actual engine test in the same manner as in Examples 1 and 2 and Comparative Example 1.

[2] Evaluation Method
The following evaluations were conducted after the actual engine test.
(1) Measurement of Side Rail Gap
After the actual engine test, a piston was withdrawn from each cylinder to measure gaps ($S_2$) of upper and lower side rails in each oil ring. Before the actual engine test, gaps ($S_1$) of upper and lower side rails when the oil ring was assembled to the piston, which were equal to gaps in a free state, were also measured to determine a ratio $S_2/S_1$. $S_2/S_1$ was determined in both upper and lower side rails, and averaged in three actual engine tests (six actual engine tests in Comparative Example 1).

(2) Measurement of Amount of Oil Sludge Deposited
After the actual engine test, the oil ring was detached from the piston, dried at 200° C. for 1 hour in an electric furnace, cooled to room temperature in a desiccator, and then measured with respect to its mass. Difference between the masses of the oil ring measured before and after the actual engine test was calculated, and averaged in three actual engine tests (six actual engine tests in Comparative Example 1) to determine the amount of oil sludge deposited.

The actual engine test results of Examples 1-4 and Comparative Example 1 are shown in Table 1. The gap is expressed by a relative value, assuming that $S_2/S_1$ in Comparative Example 1 is 100, and the amount of oil sludge deposited is expressed by a relative value, assuming that the amount of carbon sludge deposited in Comparative Example 1 is 100.

TABLE 1

| No. | $S_2/S_1$ | Amount of Oil Sludge Deposited |
|---|---|---|
| Example 1 | 220 | 78 |
| Example 2 | 300 | 49 |
| Example 3 | 255 | 54 |
| Example 4 | 320 | 43 |
| Com. Ex. 1 | 100 | 100 |

Table 1 indicates that as compared with the gap and the amount of oil sludge deposited after the actual engine test in Comparative Example 1, the gaps were as large as about 2.2-3.0 times in Examples 1 and 2 and about 2.55-3.2 times in Examples 3 and 4, and the amounts of oil sludge deposited were as small as 49-78% in Examples 1 and 2 and 43-54% in Examples 3 and 4. In Comparative Example 1, the accumulated oil sludge constrained the side rails, so that the gap did not easily return to an original one, even when the piston was withdrawn from the cylinder. On the other hand, in Examples 1-4, the attachment and accumulation of oil sludge were so reduced that constraint to the oil ring was lowered, closer to a state before the operation than in Comparative Example 1. With each groove having a raised bottom in Examples 2 and 4 when viewed along a substantially circumferential direction, it was observed that the amount of oil sludge deposited was extremely reduced when combined with a sticking-preventing Ni coating as in Examples 3 and 4.

DESCRIPTION OF REFERENCE NUMERALS 11, 21, 31: Spacer expander
12a, 12b, 32a, 32b, 105a, 105b: Tab
13a, 13b, 33a, 33b, 106a, 106b: Projection
14a, 14b, 34a, 34b, 107a, 107b: Intermediate portion
15a, 15b, 35a, 35b, 108a, 108b: Space
102: Upper portion
103: Lower portion
104: Leg portion
120a, 120b: Side rail

What is claimed is:
1. A combined oil control ring comprising:
a pair of side rails, the pair of side rails including an upper side rail and a lower side rail; and
an axially corrugated spacer expander having upper and lower portions;

said upper and lower portions of said spacer expander comprising tabs pushing inner peripheral surfaces of said side rails, projections supporting said side rails, intermediate portions between said tabs and said projections, and two circumferential ends;

each of said intermediate portions opposing one of said side rails and having at least one groove with a curved or angled bottom; and each groove primarily extending in a substantially circumferential direction and being recessed when viewed along a circumferential direction such that each groove connects the respective circumferential ends, and an oil on the intermediate portion can mainly flow in the substantially circumferential direction and downwardly from the respective circumferential ends of the groove.

2. The combined oil control ring according to claim 1, wherein a depth, d, of each groove is 0.5-20% of a combined width, h1, and the combined width, h1, is a distance from an upper surface of the upper side rail to a lower surface of the lower side rail.

3. A combined oil control ring comprising:

a pair of side rails, the pair of side rails including an upper side rail and a lower side rail; and an axially corrugated spacer expander having upper and lower portions;

said upper and lower portions of said spacer expander comprising tabs pushing inner peripheral surfaces of said side rails, projections supporting said side rails, intermediate portions between said tabs and said projections, and two circumferential ends;

each of said intermediate portions opposing one of said side rails and having at least one groove with an angled bottom;

each groove primarily extending in a substantially circumferential direction and being recessed when viewed along a circumferential direction such that each groove connects the respective circumferential ends, and wherein each groove has a raised bottom when viewed along a substantially radial direction such that it has a reversed V-shape.

4. The combined oil control ring according to claim 3, wherein a depth, d, of said groove having the raised bottom at a top of the raised bottom is 0.5-20% of a combined width, h1, and the combined width, h1, is a distance from an upper surface of the upper side rail to a lower surface of the lower side rail.

5. The combined oil control ring according to claim 1, wherein each groove is constituted by pluralities of planar portions.

* * * * *